(12) United States Patent  (10) Patent No.: US 8,010,939 B2
Melzer et al.  (45) Date of Patent: Aug. 30, 2011

(54) METHOD FOR THE GRAPHIC PLANNING OF THE CONTROL OF A TECHNICAL INSTALLATION WITH INTEGRATED PLANNING OF OPERATING DEVICES INCLUDING A PLANNING SYSTEM AND A COMPUTER PROGRAM PRODUCT

(75) Inventors: Roland Melzer, Nürnberg (DE); Michael Peter, Veitsbronn (DE); Peter Wiedenberg, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 1342 days.

(21) Appl. No.: 10/569,567

(22) PCT Filed: Jul. 26, 2004

(86) PCT No.: PCT/EP2004/008349
§ 371 (c)(1),
(2), (4) Date: Feb. 27, 2006

(87) PCT Pub. No.: WO2005/022286
PCT Pub. Date: Mar. 10, 2005

(65) Prior Publication Data
US 2007/0006143 A1    Jan. 4, 2007

(30) Foreign Application Priority Data

Aug. 27, 2003  (DE) .................................. 103 39 764

(51) Int. Cl.
*G06F 9/44*   (2006.01)
(52) U.S. Cl. ........ 717/105; 717/101; 717/104; 717/107; 717/125
(58) Field of Classification Search ........................ None
See application file for complete search history.

(56) References Cited

U.S. PATENT DOCUMENTS 4,901,221 A * 2/1990 Kodosky et al. .............. 715/771
(Continued)

FOREIGN PATENT DOCUMENTS

DE        100 65 401 A1    3/2003
(Continued)

OTHER PUBLICATIONS

"Modeling and Simulation for Customer Driven Manufacturing System Design and Operations Planning", Juhani Heilala et al. IEEE, pp. 1-10, <http://delivery.acm.org/10.1145/1351874/p185heilala.pdf?key1=1351874&key2=9886283031&coll=DL&dl=ACM&ip151.207.24 2.4&CFID=19279875&CFTOKEN=97839796>.*

(Continued)

*Primary Examiner* — Thuy Dao
*Assistant Examiner* — Ziaul A. Chowdhury

(57) ABSTRACT

The inventive method interacts with a project planning window, which has a working area at least with one window for a project planning level for displaying and linking graphic objects and with a window for a symbol library containing the graphic objects available for a project planning. To this end, graphic control objects are provided, which represent technical objects of the installation and graphic control unit objects, which represent control units that can be used for a control. In a first step, the control objects of a project planning are activated in the window for the system library and transmitted into the project planning level. In a second step, the transmitted control objects are, in the window of the project planning level, subsequently linked in a logical manner according to a control task. In a third step, at least one control unit object is activated in the symbol library and transmitted into the project planning level. In a fourth step, the graphic control unit object is assigned to selected graphic control objects. The invention offers the advantage of enabling, in a closed project planning method, both the graphic control objects, which are required for controlling installation resources, as well as control unit objects, which are required for operating and monitoring the control, to be linked in a defined and logical manner.

16 Claims, 5 Drawing Sheets

U.S. PATENT DOCUMENTS

| | | | | |
|---|---|---|---|---|
| 5,301,336 | A * | 4/1994 | Kodosky et al. | 715/846 |
| 5,361,336 | A * | 11/1994 | Atchison | 715/740 |
| 5,742,284 | A * | 4/1998 | Duggan et al. | 717/107 |
| 5,905,649 | A * | 5/1999 | Sojoodi et al. | 700/83 |
| 5,920,479 | A * | 7/1999 | Sojoodi et al. | 700/86 |
| 6,243,857 | B1 * | 6/2001 | Logan et al. | 717/111 |
| 6,282,699 | B1 * | 8/2001 | Zhang et al. | 717/109 |
| 6,408,429 | B1 * | 6/2002 | Marrion et al. | 717/100 |
| 6,425,121 | B1 * | 7/2002 | Phillips | 717/109 |
| 6,522,346 | B1 * | 2/2003 | Meyer | 715/771 |
| 6,757,568 | B2 | 6/2004 | Birzer et al. | |
| 6,868,370 | B1 * | 3/2005 | Burbridge et al. | 703/1 |
| 7,079,141 | B2 * | 7/2006 | Vazquez et al. | 345/440 |
| 7,313,761 | B1 * | 12/2007 | Mcclellan | 715/713 |
| 7,487,493 | B1 * | 2/2009 | Faulkner | 717/105 |
| 7,543,276 | B2 * | 6/2009 | Pfander et al. | 717/125 |
| 2002/0095653 | A1 * | 7/2002 | Parr et al. | 717/105 |
| 2002/0109726 | A1 * | 8/2002 | Rogers et al. | 345/771 |
| 2003/0184580 | A1 * | 10/2003 | Kodosky et al. | 345/734 |
| 2004/0015817 | A1 * | 1/2004 | Kress et al. | 717/101 |
| 2004/0075689 | A1 | 4/2004 | Schleiss et al. | |
| 2004/0083451 | A1 * | 4/2004 | Abowd et al. | 717/106 |
| 2004/0117049 | A1 * | 6/2004 | Bieber | 700/100 |
| 2004/0177678 | A1 * | 9/2004 | Grehlinger et al. | 73/54.01 |
| 2005/0149905 | A1 | 7/2005 | Brink | |
| 2006/0293768 | A1 * | 12/2006 | Rogers et al. | 700/86 |
| 2007/0156430 | A1 * | 7/2007 | Kaetker et al. | 717/104 |

FOREIGN PATENT DOCUMENTS

| | | |
|---|---|---|
| DE | 102 19 912 A1 | 11/2003 |
| DE | 103 48 564 A1 | 5/2004 |
| WO | 03093911 A1 | 11/2003 |

OTHER PUBLICATIONS

"3D and 4D Modeling for Design and Construction", Sheryl Staub-French, University of British Columbia, Jul. 2007, pp. 1-27, <http://www.google.com/#hl=en&sugexp=ldymls&xhr=t&q=3D+AND+4D+MODELING+FOR+DESIGN+AND+CONSTRUCTION+coordination+issues+and+lessons+learned&cp=46&pf=p&sclient=psy&site=&source=hp&aq=0v&aqi=&aql=&oq=3D+AND+4D.*

"Developments and Trends in Monitoring and Control of Machining Processes", H. K. Tonshoff, University of Twente, Publications, 1988, pp. 1-12, <http://doc.utwente.nl/70320/1/Tonshoff88developments.pdf>.*

* cited by examiner

METHOD FOR THE GRAPHIC PLANNING OF THE CONTROL OF A TECHNICAL INSTALLATION WITH INTEGRATED PLANNING OF OPERATING DEVICES INCLUDING A PLANNING SYSTEM AND A COMPUTER PROGRAM PRODUCT

CROSS REFERENCE TO RELATED APPLICATION

This application is the US National Stage of International Application No. PCT/EP2004/008349, filed Jul. 26, 2004 and claims the benefit thereof. The International Application claims the benefits of German Patent application No. 10339764.7 DE filed Aug. 27, 2003, both of the applications are incorporated by reference herein in their entirety.

FIELD OF THE INVENTION

The field of the invention is directed towards an inventive method that interacts with a project planning window, which has a working area at least with one window for a project planning level for displaying and linking graphic objects and with a window for a symbol library containing the graphic objects available for a project planning.

BACKGROUND OF THE INVENTION

It is known that the control of a technical installation by an automation system, e.g. a programmable logic controller, can be planned by means of graphic methods and mechanisms. SIEMENS for example uses Software STEP 7, which allows a user to create control programs based on functional software components. Depending on the application, a number of different functional software components, e.g. operational components, data components, system components, organizational components, etc. are defined graphically and linked logically with the aid of visual means to a control program. The control program then prompts a programmable logic controller PLC to operate the operating means of the respective technical process, e.g. sensors, drives, valves, etc. in the manner defined by the functional software modules and their logical links in the control program. Data telegrams are thereby generally exchanged via a field bus, for example in real time between installation operating means and the PLC.

The operating and monitoring level is of increasing significance along with this purely control level. Special hardware and software, also referred to as HMI elements, are available for this. Different types of HMI terminals, also referred to as operator interfaces, are available for display and operating purposes. There is a wide range of display and operating units, from a simple push button panel, in other words an array of programmable function buttons, to a multifunctional panel, in other words an LCD display, which can also be configured as a touch screen. These are connected via special connections or a field bus to the technical installation and the programmable logic controller. Planning software is also required for the operator panels. This on the one hand allows planning of the data connection from the HMI hardware used for operating purposes to the automation system and the controlled technical installation. It can be used in particular in the simplest instance to select displayable measured values or installation operating means provided for operating purposes, in other words for providing with target values. On the other hand the planning software allows a user to select and configure the type and scope of the values from the technical installation displayed on the HMI hardware in an application-specific manner. These can range from simple message texts to complex, interactive process mappers. Simple planning software therefore allows direct planning of HMI panels. HMI projects for operator panels can be implemented with special visualization software for installation and machine-related visualization. Finally complex processes can be visualized with the aid of SCADA or supervisor control and data acquisition software, meaning that they can be monitored and operated in a more user friendly and reliable manner by operators of a technical process.

Until now it has been standard practice when automating a technical installation for the planning of the control program for the programmable logic controller to be separate from the planning of HMI elements. An HMI system is often loaded onto an already planned control program at a later stage. Even if the functional software components and their links in the control program can be accessed during this process, the HMI component program is generally created at a different time, primarily using separate HMI planning software. This is complex and time-consuming.

SUMMARY OF THE INVENTION

The object of the invention is to specify a method for the graphic planning of the control of a technical installation and a corresponding graphic planning system, with which planning of HMI elements is also possible in a work sequence or with a planning tool, in addition to the creation of the control program.

The objects are achieved with the method specified in the claims and the system specified in the claims.

The claimed method for the graphic, object-based planning of a control for a technical installation interacts with a planning window, which has a work area at least with one window for a planning level for displaying and linking graphic objects and with one window for a symbol library containing the graphic objects available for planning. Graphic control objects at least are thereby present, representing technical objects of the installation, as well as graphic operating device objects, which represent operating devices that can be used for a control.

In a first step of the claimed method the graphic control objects of planning are activated in the window for the symbol library and transferred to the window for the planning level. Then in a second step in the window for the planning level the transferred graphic control objects are linked logically according to an installation-specific control task. Then in a third step at least one graphic operating device object is activated in the window for the symbol library and transferred to the window for the planning level. Finally in a fourth step of the claimed method the graphic operating device object is assigned to selected graphic control objects.

The invention has the particular advantage that it is possible to define and logically link both the graphic control objects required for the control of installation operating means and the operating device objects necessary for the operation and monitoring of the control of the technical installation in a closed planning method. With the aid of the invention the planning of the HMI functions is therefore integrated into the overall planning both with regard to execution and function. It is particularly advantageous that the elements available for the planning of the graphic control objects in the planning window, i.e. the windows for the symbol library and the planning level, are also used in the same manner for the planning of the graphic operating device objects for the HMI panels used.

It is advantageous if the activation and transfer of graphic control or operating device objects in the planning window are effected by means of graphic interactions. Drag and drop actions in particular are used on the graphic objects as graphic interactions with the aid of graphic operating means.

To improve the functionality of the claimed planning method further, a further window may be present in the planning window, in which a directory tree is automatically generated and managed for the graphic objects in the planning level.

This embodiment facilitates planning transparency, as the levels of the list structure of a directory tree ensure a better overview of the respective planning status than the content of the planning level. Also the directory tree can be used to switch between the different display contents of the window for the planning level in a simple and transparent manner. It is therefore possible for the graphic objects associated with a branch of the directory tree to be displayed in the window for the planning level by means of graphic interactions in the directory tree, in particular by means of activations.

The directory tree is advantageously structured such that it has a first and a second main branch. The graphic control objects of planning at least can be activated in the first main branch and the graphic operating device objects of planning at least can be activated in the second main branch. This structure highlights the advantage of the invention, in that during planning the graphic control objects required for process management of the technical installation and the graphic operating device objects used for the associated operation and monitoring are managed with approximately equal priority in corresponding main branches of the directory tree.

Finally according to a further embodiment of the claimed method it is advantageous for the directory tree to have a third main branch, in which the connections to a data bus assigned to the graphic control objects are managed. Such a structure then provides an optimum overview and access to the most important levels, which have to be planned during automation of a technical process, namely the control level, the operating and monitoring level and the data transmission level, in particular via a field bus.

The claimed system for the graphic planning of a control for a technical installation has a planning window, graphic interaction means and planning means. The planning window thereby has a work area, which according to the invention is divided at least into one window for a symbol library containing the graphic objects available in the system for the planning of a technical installation, one window for a planning level for displaying and logically linking the graphic objects selected for the planning of a technical installation and one window for a directory tree of the graphic objects of planning selected in the window for the planning level. The graphic interaction means allow the selection of graphic objects in the window for the symbol library and the generation and logical linking of the selected graphic objects in the window for the planning level. The planning means then automatically adjust the directory of graphic objects in the window for the directory tree after generation of the selected graphic objects in the window for the planning level.

This claimed system allows the compact and per se closed planning of all graphic objects required for automation in a single planning tool. All types of graphic objects can hereby be processed in the same manner, depending on the content of the symbol library. Preferably at least available graphic control objects, which represent technical objects of a technical installation, and graphic operating device objects, which represent operating devices that can be used for a control, are thereby present as graphic objects in the symbol library.

The graphic interaction means particularly advantageously allow the selection and assignment of a graphic operating device object to a group of graphic control objects and the planning means automatically generate a set of operating sub-objects for the graphic operating device object after assignment in the window for the directory tree.

The flexibility of the claimed system is particularly clear with this embodiment, in that a graphic operating device object can be assigned as a function of the respective structure of the technical installation and the operating and monitoring requirements of the respective operator to all, a group of or even individuals of the associated graphic control objects as a function of the application during the planning of the control. A set of operating sub-objects is then generated automatically as a consequence in the directory tree. These can be graphic operating objects, alarm objects, formulation objects, archive objects, etc., which are automatically provided for the planning of an operating device. This will be described in even more detail below with reference to the exemplary embodiments shown in the figures.

The invention is also directed towards a computer program product with a computer program, having software means to implement the above-mentioned method for the graphic planning of a control for a technical installation, when the computer program is executed in a data processing system, an HMI device, an automation system or a graphic planning unit.

BRIEF DESCRIPTION OF THE DRAWINGS

Further advantageous configurations are set out below in the context of the description of the advantageous embodiments shown in the figures.

The invention is described in more detail with reference to the figures referred to briefly below, in which.

DETAILED DESCRIPTION OF THE INVENTION

Figure 1:
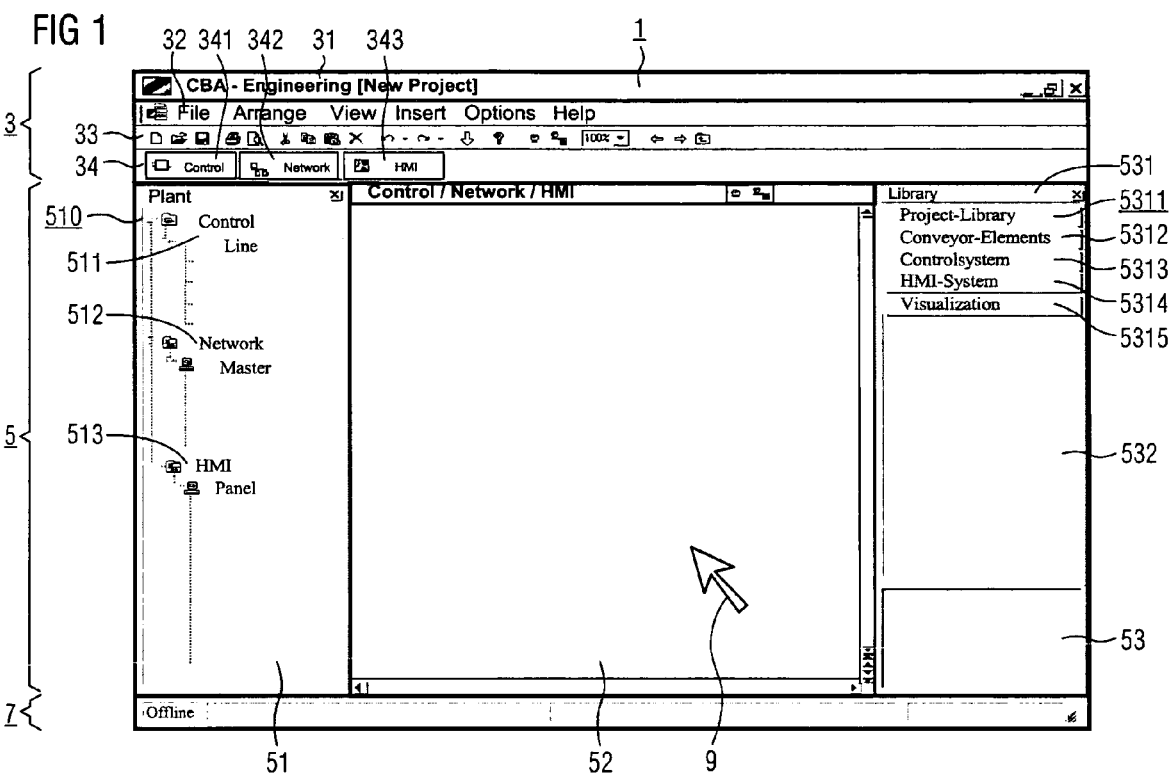
FIG. 1 shows an exemplary embodiment of a planning window of the claimed planning system.

FIG. 1 shows an exemplary embodiment of a planning window 1 configured according to the claimed planning system. The planning window 1 is also the basis for the illustrations in the further FIGS. 2 to 7, which are used by way of an example to describe the individual steps of the claimed planning method.

The exemplary planning window 1 is divided horizontally by way of an example into three areas, i.e. an upper window area 1 for toolbars, a middle window area 5 for the work area, also referred to as the workbench, and a lower window area 7 for status information. The upper window area 1 contains four further toolbars in the example. The first toolbar 31 for the program and file display on the one hand contains a designation of the program name according to the conventions of windows-based programs. The claimed planning system in the example is thereby labeled with the designation "CBA—Engineering", CBA being an abbreviation for component based automation. It is followed in square brackets by the designation of the respective project file, for which in the present instance an individual project name has not yet been assigned, therefore the general designation [New Project] appears. The toolbar 32 below contains pulldown menus for program operation and the toolbar 33 contains standard user functions. As the toolbars 32, 33 in the upper window area 3 and the lower window area 7 for status information also correspond to the conventions for windows-based programs, they will not be described in any more detail below.

According to the invention the middle area of the planning window 1 provided for the work area 5 is again divided into three windows, namely one window 51 for a directory tree 510, one window 52 for a planning level and one window 53 for a symbol library 531. In the example in FIG. 1 these are disposed vertically next to each other and are labeled "Plant", "Control/Network/HMI" and "Library".

According to the invention the window 52 is used for the planning level, to display and link graphic objects during control planning. The windows 53 and 51 to the right and left in the example in FIG. 1 are used to assist this graphic planning. Therefore the graphic objects available in a symbol library 531 for planning are listed in the window 53. According to the invention at least graphic control objects representing technical objects of the installation are present, as are graphic operating device objects representing operating devices that can be used for a control. The control objects can also be referred to as CBA or component based automation objects and the operating device objects as HMI or human machine interface objects. In the example in FIG. 1 the content of the symbol library 531 is advantageously divided into folders. Planned projects that have already been undertaken could for example be stored in the folder 5311 "Project Library". The folders 5312 and 5313 contain collections of graphic control objects, with objects representing "Conveyor-Elements" collected in 5312 and objects representing the control components or the "Control system" being collected in 5313. In the example in FIG. 1 the folders 5314 and 5315 contain graphic operating device objects, with the HMI devices that can be used in planning being listed in 5314 "HMI-System" and available operating elements being listed in 5315 "Visualization". The graphic objects contained in each folder are shown in a display area 532 below. This is described in more detail in FIGS. 2 to 7.

During planning an operator can mark objects required specifically for the installation in the corresponding folder in the window 53 and also in the window 51 for the directory tree 510 and advantageously transfer them to the planning level 52 with the aid of graphic interactions. The interactions used on the graphic objects can advantageously be drag and drop actions with the aid of graphic operating means, in particular a visual cursor 9 guided using a so-called computer mouse.

According to the invention the graphic control objects generated and logically linked in the planning level 52 are automatically visualized in the window 51 for the directory tree 510. The directory tree 510 shown in FIG. 1 has three main branches 511, 512, 513 for this purpose, which are only shown partially in FIG. 1 but are shown in more detail in the subsequent figures. The first main branch 511 marked CONTROL lists the graphic control objects of planning. The part of the installation described in more detail below is for example referred to as LINIE1 (LINE 1). The graphic operating device objects of planning are listed in a further main branch 513 marked HMI. In the example illustrated in the figures an operating device is used, which is marked in the directory tree 510 as PANEL.

According to an advantageous further embodiment already shown in FIG. 1, the directory tree 510 has a third main branch 512 marked NETWORK. The connections to a data bus assigned to the graphic control objects in the main branch 511 CONTROL during planning are managed here. A device referred to as MASTER is already listed as a main unit connecting the control objects to a data bus in the main branch 512.

The individual main branches 511, 512, 513 can be activated, again preferably by graphic interactions using the visual cursor 9. This displays the associated project components in the planning level 52. This is shown in the header line of the planning level 52 by the heading "Control/Network/HMI". The subsequent figures show how further planning components can be visualized in the planning level 52 by activating secondary and sub-branches of a main branch in the directory tree 510. It is also possible to switch between these display statuses of the window 52 for the planning level by means of appropriately labeled virtual switch elements in the toolbar 34. The status "Control", "Network" or "HMI" can thereby be activated in the planning level 52 by activating a button 341, 342 or 343 in the toolbar 34.

Figure 2:
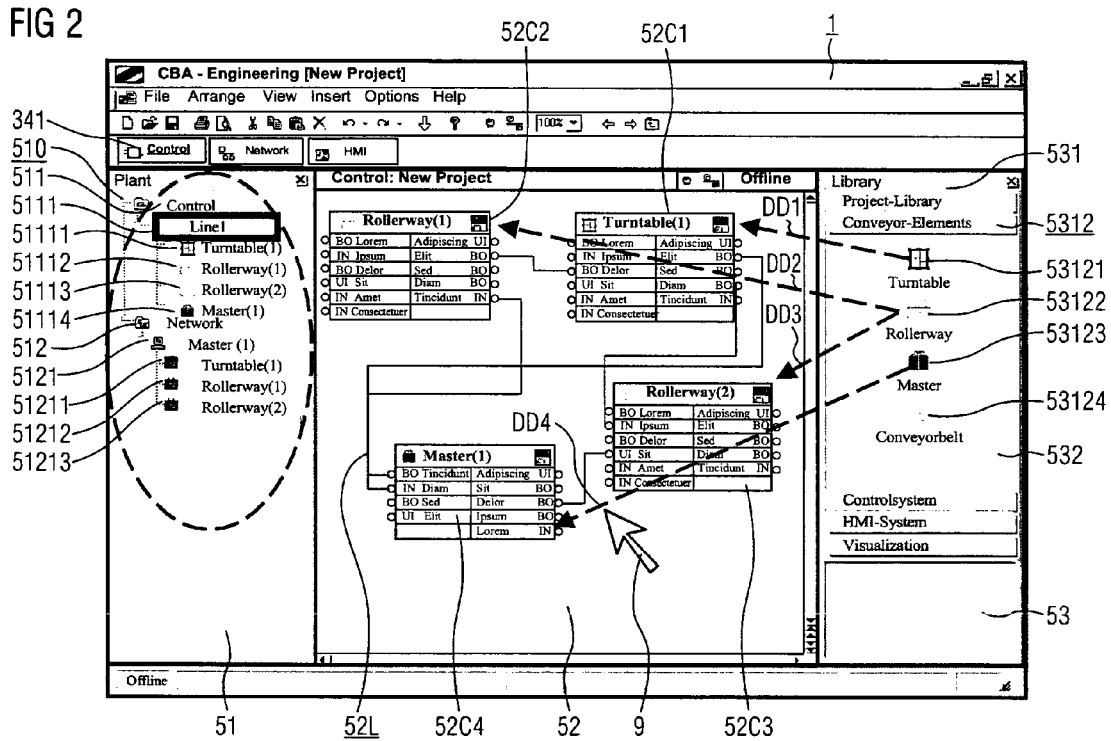
FIG. 2 shows an application of the planning window in FIG. 1 for the planning of an exemplary control, with the definition, transfer and linking of graphic control objects of planning being effected between the symbol library and the planning level by means of drag and drop actions.

FIG. 2 shows an application of the planning window 1 in FIG. 1 for the planning of an exemplary control, with graphic control objects of planning being defined, transferred and linked between the symbol library 531 and the planning level 52 by means of drag and drop actions DD1-DD4. The part to be planned in the example shown is a conveyor belt in a technical installation. For planning purposes therefore the folder 5312 in the symbol library 531 is activated, which contains "Conveyor Elements". It contains graphic control objects, which represent corresponding installation components. Control objects TURNTABLE 53121, ROLLERWAY 53122, Master 53123 and CONVEYORBELT 53124 are therefore listed by way of an example in the display area 532 of the folder 5312.

According to the claimed planning method in a first step the graphic control objects required for the respective planning are activated in the window 53 for the symbol library 531 and transferred to the window 52 for the planning level. Thus in the example in FIG. 2 the graphic control object 53121 TURNTABLE is activated in the display area 532 and moved preferably by means of a drag and drop action DD1 using the cursor 9 to the planning level 52. There the planning system automatically generates a logically linkable functional software component 52C1 TURNTABLE, which has a number of inputs and outputs on the left and right sides. These represent all the parameterizable input and output variables of the respective functional software module and are only labeled symbolically in the figures for the purposes of simplicity. To complete the planning, a control object 53122 ROLLERWAY, a further control object 53122 ROLLERWAY and a control object 53123 MASTER have been activated correspondingly by means of further drag and drop options DD2 to DD4 and transferred to the planning level 52. The planning system generates the functional software components 52C2 ROLLERWAY, 52C3 ROLLERWAY and 52C4 MASTER there, again automatically. No control object of the type CONVEYORBELT 53124 is required in the example.

In a second step of the claimed planning method the transferred graphic control objects 52C1 to 52C4 are linked logically in the window 52 of the planning level according to an installation-specific control task. The control is thus programmed by a logical linking of selected input and outputs of the associated functional software component. The resulting logical linking network in the example in FIG. 2 is marked with the reference character 52L.

According to the invention the directory tree 510 is automatically updated in the window 51 based on the above planning operations. Therefore the planning system has generated specific sub-branches 51111 "Turntable 1", 51112 "Rollerway 1", 51113 "Rollerway 2" and 51114 "Master 1" for every graphic control object 52C1 to 52C4 in the planning level below 52 the sub-branch 5111 LINIE1 (LINE 1) in the main branch 511. These can be activated individually. Activating a sub-branch makes it possible to display specific HMI or service representations for example in the planning level 52. The planning system also completed the sub-branches to the main branch NETWORK 512 correspondingly. The sub-branches 51211 "Turntable 1", 51212 "Rollerway 1" and 51213 "Rollerway 2" associated with the graphic control objects are thereby subordinated to the sub-branch 5121 "MASTER 1". This is explained below with reference to FIG. 3.

Figure 3:
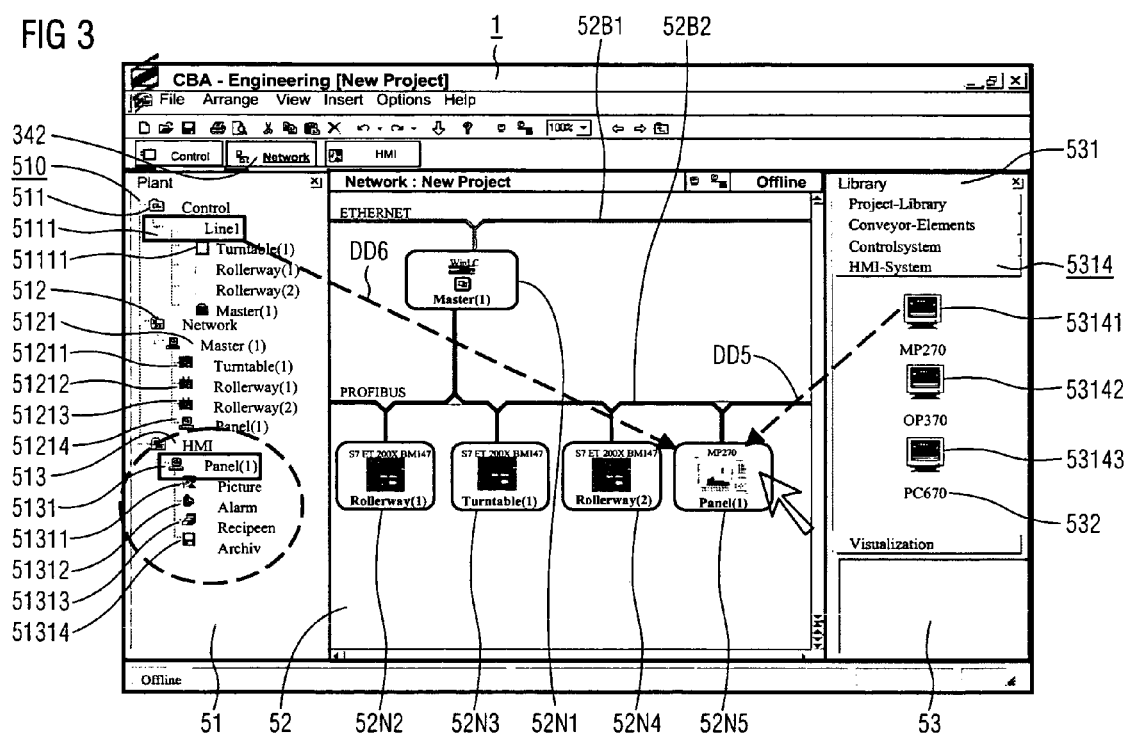
FIG. 3 shows the planning window in FIG. 2, with activation and assignment of an operating device object from the symbol library to the graphic control objects in the planning level being effected by means of drag and drop actions.

FIG. 3 shows the planning window in FIG. 2 with an operating device object being activated, transferred and assigned from the symbol library to the graphic control objects in the planning level by means of drag and drop actions. So that this is possible, the folder 5314 containing the available graphic operating device objects is active in the symbol library 531. In the example in FIG. 3 three operating device objects are available for selection for planning in the display area, i.e. an operating device object 53141 of the type "MP270", an operating device object 53142 of the type "OP370" or an operating device object 53143 of the type "PC670".

In the example shown in a third step of the claimed planning method the graphic operating device object 53141, representing an operator panel of the type "MP270", is first activated in the window 53 of the symbol library and transferred to the planning level 52. As the status "Network" is active in the planning level in the example in FIG. 3 and therefore the data transmission link for the graphic control objects of planning via system and field buses is shown, a corresponding network object 52N5 is generated by transferring the graphic control object 53141 for the PANEL1. This is effected automatically by the planning system in the same manner as the network objects 52N2 "Rollerway 1", 52N3 "Turntable 1", 52N4 "Rollerway 2" and 52N5 "Panel 1" are linked to a field bus, which is of the PROFIBUS type in the example in FIG. 3. The field bus 52B2 is in turn linked via the network object 52N1 "Master 1" to a system bus 52B1, which is of the ETHERNET type in the example in FIG. 3.

Once the graphic operating device object 53141 has been selected and transferred, according to the invention the directory tree 510 is again extended correspondingly in the window 51 in FIG. 3. A sub-branch 5131 connected to the main branch 513 is thus generated for the graphic operating device object and labeled PANEL1. According to further embodiments of the invention already shown in FIG. 2, different operating sub-objects are assigned automatically to the PANEL1 by the planning system, in the example the operating sub-objects 51311 PICTURE, 51312 ALARM, 51313 RECIPEEN (FORMULATIONS) and 51314 ARCHIVE (ARCHIVE). So for example by activating the sub-branch 51311 PICTURE in an overview image in the planning level 52 it is possible to display the graphic operating objects 5131111, 5131112, 5131113 automatically assigned to each graphic control object of the group LINIE1 (LINE1). This is explained in more detail based on the example in FIG. 5.

Alarm objects can also be assigned automatically to each graphic object in the LINIE1 (LINE1) group as the second operating sub-objects 51312 in the window 51 for the directory tree 510. Alarm statuses, alarm texts, etc. can hereby be planned separately for each graphic control object. The respective alarm objects can also be displayed here by activating the sub-branch 51312 in the planning level 52. Finally a formulation object or an archive object can be automatically assigned to each graphic control object in the LINIE1 (LINE 1) group as third or fourth operating sub-objects 51313 or 51314 in the window 51 for the directory tree 510. Particularly if a graphic control object represents a method-related component in a process automation installation, it can be allocated a specific control sequence via a formulation object. Finally an archive object allows sequenced and, most importantly, retrievable storage for example of miscellaneous process data, messages and operating parameters, e.g. target value adjustments, which occur during ongoing operation of the planned technical installation.

Finally the directory tree 510 in the main branch 512 NETWORK is also automatically extended. A Network sub-branch 51214 assigned to the newly defined PANEL1 is thus shown connected to the sub-branches 51211 "Turntable 1", 51212 "Rollerway 1" and 51213 "Rollerway 2" present for the graphic control objects of planning. By activating one of the sub-branches, e.g. the sub-branch 51211 "Turntable 1", it is possible to display views in the planning level 52 showing details corresponding to an interface module, for example of the type "S7 ET 200×BM147" assigned to the Turntable 1 and allow parameterization.

This is followed by the fourth step of the claimed planning method, namely the assignment of the activated and transferred graphic operating device object PANEL1 52N2 to the group of LINIE1 (LINE1) graphic control objects present in the planning level 52. Only then is the planning of the technical installation completed with regard to control and operation. Various options are available in practice for implementing this step. Essentially implementation of the fourth step is a function of the status active in the planning level 52, e.g. the CONTROL or NETWORK status. A link to a selected and transferred graphic operating device object is therefore possible when with active CONTROL status the functional software modules 52C1-52C4 are displayed or with active NETWORK status the network objects 52N1-52N4 of the graphic control objects are displayed.

FIG. 3 shows an option for assignment based on the example of the planning level 52 in the NETWORK status. The sub-branch 5111 of LINIE1 (LINE1) is thereby activated by means of a graphic interaction DD6, in particular by a drag and drop action, in the directory tree 510 and moved into the planning level 52 to the network object 52N5 of PANEL1. The planning system then assigns PANEL1 to the group of control objects marked LINIE1 (LINE1). Now according to the object of the invention the planning of at least one HMI element is implemented in addition to the planning for control purposes by logical linking of the selected and generated graphic control objects. In another instance (not shown) it would also have been possible to activate the sub-branch 51111 "TURNTABLE 1" and move it into the planning level 52 to the network object 52N5 of PANEL1. The panel of type MP270 would then have been allocated solely for the operation and monitoring of a single rotary table in the technical installation, represented by a control object TURNTABLE.

Figure 4:
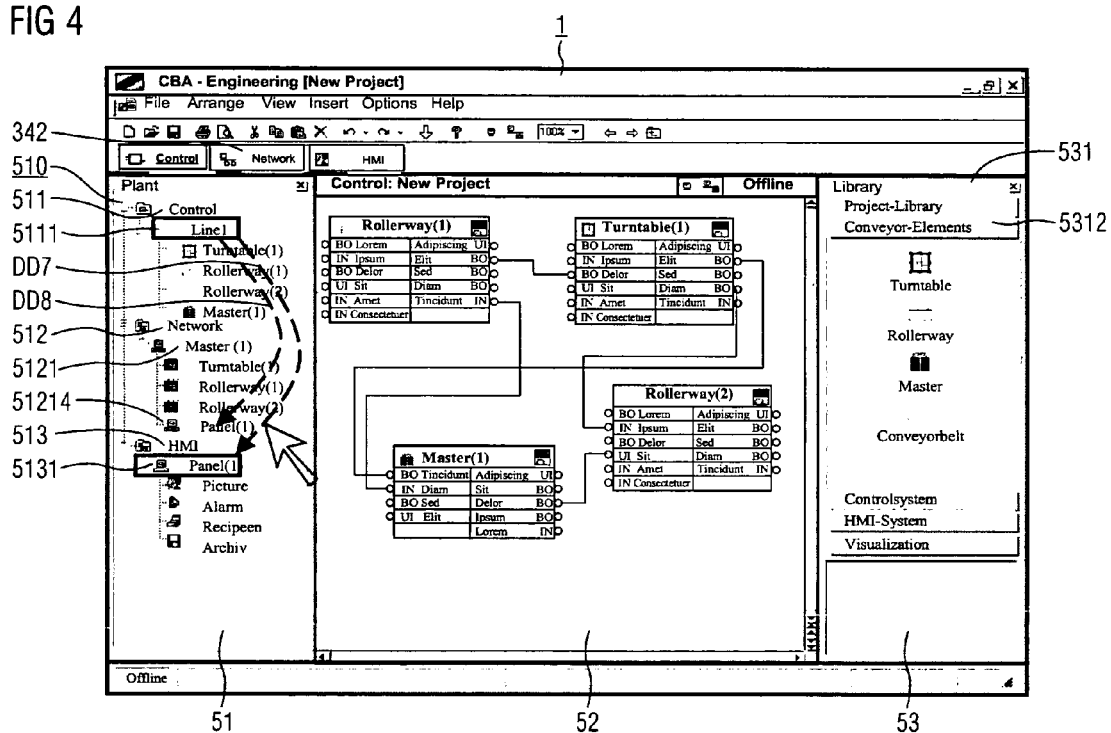
FIG. 4 shows an assignment of an operating device object to the graphic control objects of planning by means of a drag and drop action in the window for the directory tree, as an alternative to that in FIG. 3.

FIG. 4 shows a further option for assignment of the selected operating device object PANEL1 to the graphic control objects of planning by means of a drag and drop action in the window 51 with the directory tree 510, as an alternative to FIG. 3. The planning level 51 is thereby in CONTROL status, i.e. the linked functional software components of the control objects are shown. As already described above, the directory tree 510 is constantly updated while graphic planning is implemented. On the one hand a sub-branch 51214 PANEL1 was extended in the main branch NETWORK 512 with the activation and transfer of a graphic operating device object as described above. A sub-branch 5131 PANED was also extended in the main branch HMI 513. There are thus two branches available for a link in the directory tree 510. The sub-directory 5111 LINIE1 (LINE1) can therefore be moved either by means of a graphic interaction DD7 to the sub-directory 5131 PANEL1 or by means of an interaction DD8 to the sub-directory 51214 PANEL1, thereby completing the required assignment.

Figure 5:
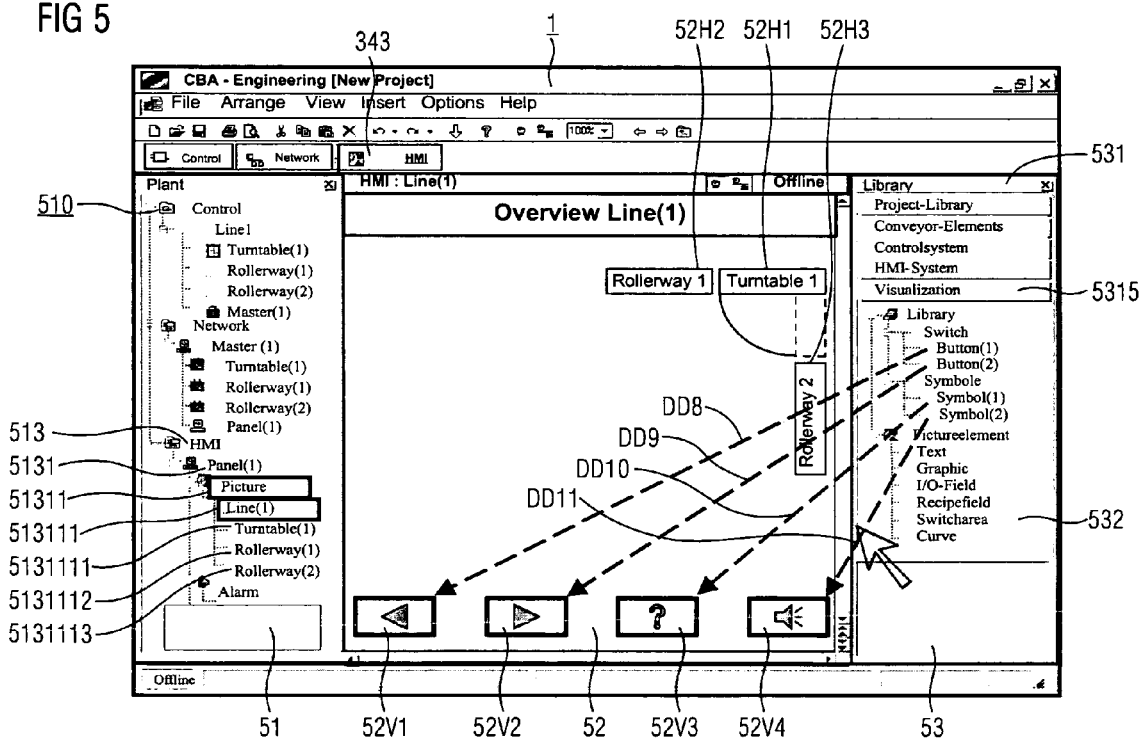
FIG. 5 shows the planning window in FIG. 3 in a detailed HMI view, with operating sub-objects assigned to the graphic control objects of planning being generated automatically in the directory tree for the operating device object and being displayed in an overview in the planning level.

FIG. 5 shows the planning window in FIG. 3 in a detailed HMI view, with the operating sub-objects assigned to the graphic control objects of planning being generated automatically in the directory tree for the operating device object and being displayed in an overview image in the planning level. In FIG. 5 the status HMI is therefore activated particularly in the planning level 52. By activating the end branch 513111 Linie1 (Line1) in the sub-branch 51311 PICTURE in the directory tree 510, it is possible to display the graphic operating objects 52H1 for TURNTABLE 1, 52H2 for ROLLERWAY 1 and 52H3 for TURNTABLE 2 automatically assigned to each graphic control object of the group LINIE1 (LINE1) in an overview image in the planning level 52. The operating objects 52H1, 52H2 and 52H3 can thereby be freely positioned by a user in the overview image with the aid of graphic interactions. The overview image can thus be configured and further planned as a function of the application, to facilitate operation and monitoring of the installation. Further operating element objects can thus be generated in the overview image for example for access to the operating objects 52H1, 52H2, 52H3. In the example in FIG. 5 operating element objects are defined for this purpose for a virtual forward button 52V1, a back button 52V2, a help button 52V3 and an alarm indicator 52V4. These can be used for example to carry out manual operations on one of the operating objects 52H1, 52H2, 52H3, i.e. agreeing a simulation of manual operation or alarm states.

The generation of such operating element objects is advantageously also effected by means of graphic planning. To this end the folder 5315 is activated in the window 53 for the symbol library in FIG. 5. The operating element objects available for visualizations in HMI activation status of the planning level 52 are shown in the display area 532. HMI switch elements SWITCH, freely assignable HMI symbols SYMBOLS, HMI display elements PICTUREELEMENT, etc. are therefore available. In the example in FIG. 5 the above-mentioned operating element objects 52V1, 52V2, 52V3 and 52V4 for example have been moved by means of drag and drop actions DD8 to DD11 from the window 52 for the symbol library to the planning level 52 and positioned there as a function of application.

Finally end branches 5131111, 5131112, 5131113 are available in the directory tree 510 for the graphic operating objects 52H1 TURNTABLE1, 52H2 ROLLERWAY1, 52H3 ROLLERWAY2. By activating one of these branches it is possible to display detailed views in the planning level 52, allowing detailed planning of the assigned control object. Activation of the end branch 5131111 thus allows an operating component to be displayed, allowing parameters for a set-up operation, diagnosis and optimization.

The invention claimed is:

1. A method for the graphic planning of a control for a technical installation, with a planning window, comprising:
providing a work area at least with one window for a planning level for displaying and linking graphic objects and one window for a symbol library containing the graphic objects available for planning, graphic control objects representing technical objects of the technical installation, and graphic operating device objects representing operating devices that can be used for a control;
activating the graphic control objects of planning in the window for the symbol library and being transferred to the window for the planning level in a first step;
linking the transferred graphic control objects according to an installation-specific control task in the window of the planning level in a second step;
activating at least one graphic operating device object in the window of the symbol library and being transferred to the window of the planning level in a third step, and
assigning the graphic operating device object to selected graphic control objects in a fourth step,
wherein the technical installation is controlled by a programmable logic controller and operated and monitored via an operating device, and
wherein the programmable logic controller and the operating device are programmed simultaneously via the graphic planning.

2. The method according to claim 1, wherein the activation and transfer of graphic control or operating device objects to the planning window is effected by graphic interactions.

3. The method according to claim 1, wherein the graphic interactions used are drag and drop actions on the graphic objects with the aid of a visual cursor.

4. The method according to claim 1, wherein a directory tree for graphic objects in the planning level is automatically generated and managed in the planning window in a further window.

5. The method according to claim 4, wherein the graphic objects associated with a branch of the directory tree are able to be displayed in the window of the planning level by graphic interactions in the directory tree.

6. The method according to claim 4, wherein the directory tree further comprises a first main branch, in which at least the graphic control objects of planning is activated and a second main branch, in which at least the graphic operating device objects of planning are activated.

7. The method according to claim 6, wherein the directory tree has a third main branch, in which the connections to a data bus assigned to the graphic control objects are managed.

8. A non-transitory computer readable storage medium storing a computer program that has software for implementing a method for graphic planning of a control for a technical installation when the computer program is executed in a data processing system, an HMI device, an automation system or a graphic planning unit, the method comprising:
providing a work area at least with one window for a planning level for displaying and linking graphic objects and one window for a symbol library containing the graphic objects available for planning, with graphic control objects present, which representing technical objects of the technical installation, and graphic operating device objects present, which representing operating devices that can be used for a control;
activating the graphic control objects of planning in the window for the symbol library and being transferred to the window for the planning level in a first step;

linking the transferred graphic control objects according to an installation-specific control task in the window of the planning level in a second step;

activating at least one graphic operating device object in the window of the symbol library and being transferred to the window of the planning level in a third step, and assigning the graphic operating device object to selected graphic control objects in a fourth step, wherein the technical installation is controlled by a programmable logic controller and operated and monitored via an operating device, and wherein the programmable logic controller and the operating device are programmed simultaneously via the graphic planning.

9. A system for the graphic, object-based planning of a control for a technical installation, comprising:

a display unit with a display;

a planning window, the display comprising the planning window;

a work area associated with the planning window and is divided into at least one window for a symbol library containing the graphic objects available in the system for the planning of a technical installation, one window for a planning level for the display and logical linking of the graphic objects selected for the planning of a technical installation and one window for a directory tree of the graphic objects of planning selected in the window for the planning level;

a graphic interaction component allowing the selection of graphic objects in the window for the symbol library and generation and logical linking of the selected graphic objects in the window for the planning level; and a planning component that automatically adjusts a directory of graphic objects in the window for the directory tree after generation of the selected graphic objects in the window for the planning level, wherein at least the following graphic objects are available in the symbol library:

graphic control objects that represent technical objects of a technical installation; and graphic operating device objects that represent operating devices used for a control, wherein the technical installation is controlled by a programmable logic controller and operated and monitored via an operating device, and wherein the programmable logic controller and the operating device are programmed simultaneously via the graphic planning.

10. The system according to claim 9, wherein the graphic interaction component allows the selection and assignment of a graphic operating device object to a group of graphic control objects and after assignment the planning component in the window for the directory tree automatically generates a set of operating sub-objects for the graphic operating device object.

11. The system according to claim 10, wherein the planning component automatically assigning a graphic operating object to every graphic control object of the group as the first operating sub-objects in the window for the directory tree.

12. The system according to claim 11, wherein the graphic operating objects for the graphic control objects of the group are able to be displayed in an overview image in the window for the planning level.

13. The system according to claim 10, wherein the planning component automatically assigns an alarm object to every graphic control object of the group as the second operating sub-objects in the window for the directory tree.

14. The system according to claim 10, wherein the planning component automatically assigns a formulation object to every graphic control object of the group as the third operating sub-objects in the window for the directory tree.

15. The system according to claim 10, wherein the planning component automatically assigns an archive object to every graphic control object of the group as the fourth operating sub-objects in the window for the directory tree.

16. The system according to claim 9, wherein the graphic interaction component has drag and drop functions for selecting and generating graphic objects in the planning window.

* * * * *